United States Patent Office 2,873,427
Patented Feb. 10, 1959

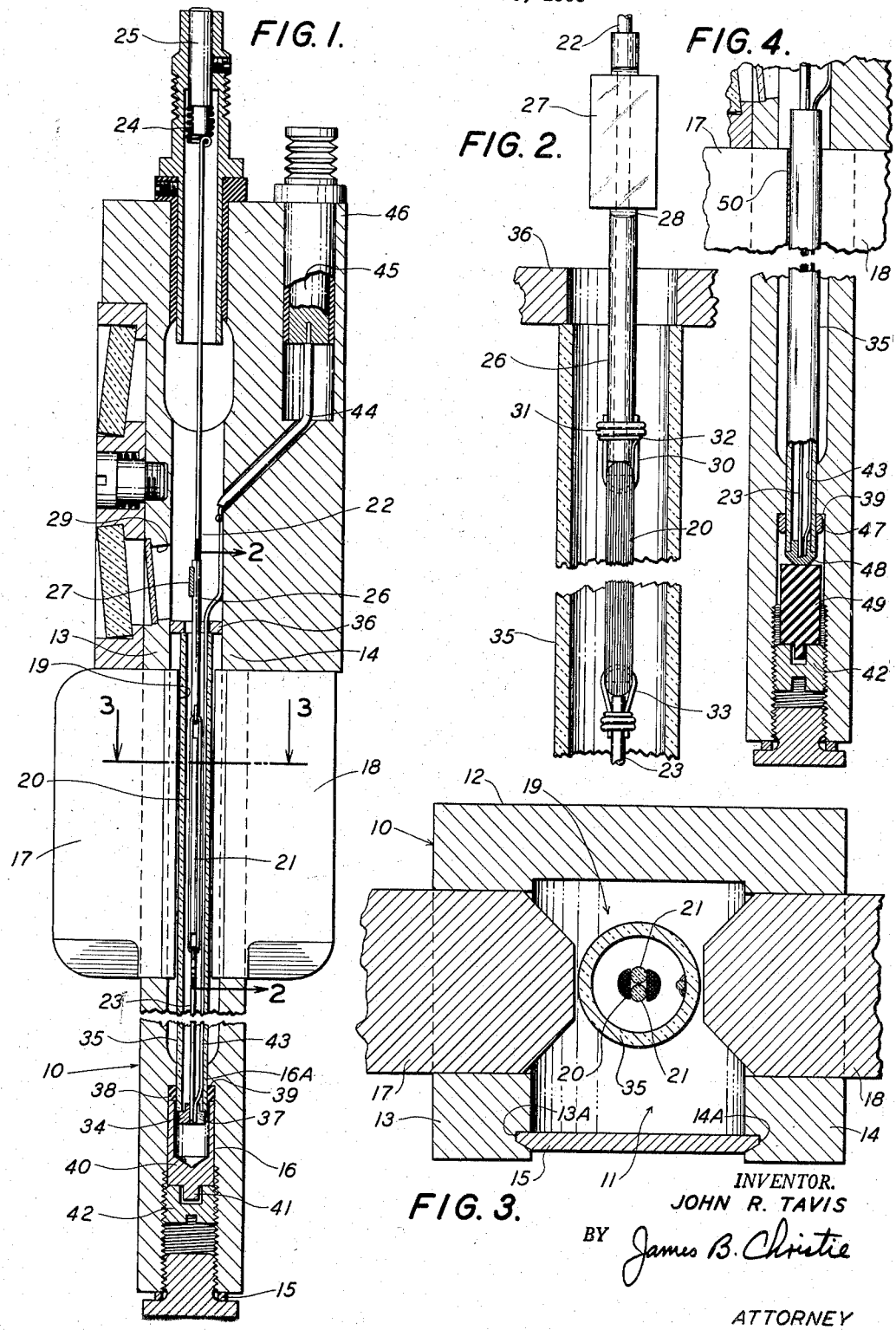

2,873,427
SUSPENSION GALVANOMETER

John R. Tavis, Los Angeles, Calif., assignor, by mesne assignments, to Consolidated Electrodynamics Corporation, Pasadena, Calif., a corporation of California Application October 19, 1953, Serial No. 386,873

6 Claims. (Cl. 324—97)

This invention relates to galvanometers of the type adapted to respond to alternating or oscillating voltages, and more particularly to the type of laboratory and portable galvanometers used for recording alternating voltage oscillations.

Galvanometers of this type have been in use for a considerable time in recording cameras and the like. Such galvanometers commonly comprise a lightweight coil suspended in a case between the poles of a magnet by means of upper and lower suspension wires or ribbons. The fluctuating voltage to be indicated by the galvanometer is connected to the coil terminals so that the coil oscillates accordingly. A mirror attached to the suspension wire responds according to the oscillations of the coil so that a light beam reflected from the mirror correspondingly oscillates back and forth on a surface against which it is directed.

It is common practice in such galvanometers to employ damping systems for reducing the response of the galvanometer coil and suspension wires at or near the natural period of oscillation. The present invention provides improvements in damping comprising an elongated tube disposed coaxially around the lower suspension wire, the coil, and a portion of the upper suspension wire. An anchoring element is disposed at the bottom end of the tube to which the lower end of the lower suspension wire is attached. Sealing means are provided at the bottom of the tube so the lower end of the tube is fluid tight. In a preferred form of the invention, the tube is transparent to provide for visual inspection and is of an electrical insulating material so that the lower coil terminal is not grounded to the case. The upper coil terminal is also insulated from the case, and thereby an ungrounded galvanometer is provided.

The foregoing and other features of my invention will be better understood from the following detailed description and the accompanying drawing in which:

Fig. 1 is a sectional elevation of a galvanometer according to the invention;

Fig. 2 is an enlarged sectional elevation taken on line 2—2 of Fig. 1;

Fig. 3 is a transverse section taken on line 3—3 of Fig. 1; and

Fig. 4 is a fragmentary elevation of the galvanometer of Fig. 1 according to a modification of the invention.

The illustrations are of a fluid damped galvanometer employing stiffening means in the coil and on the upper suspension wire. However, the invention is neither embodied in or limited to the specific galvanometer illustrated.

Referring to the galvanometer shown in Figs. 1 to 3, the instrument comprises a case 10 in the form of a square or rectangular prism whose length is many times greater than its cross-sectional dimension. An elongated groove 11 is provided in the intermediate portion of the case to form back-side 12 and two sides 13 and 14. A cover 15 is adapted to be put on or taken off by sliding it in grooves 13A and 14A formed internally in sides 13 and 14. The lower end of the case is provided with a first longitudinal bore 16 extending from the end of the case almost into the groove. A smaller second longitudinal bore 16A connects the groove with the first bore. The lower portion of the first bore is threaded internally. A pair of pole pieces 17 and 18 are fastened through the sides 13 and 14 of the case so as to leave a narrow elongated gap 19 between the two pole pieces in a central location in the case as shown in Fig. 1 and Fig. 3.

An elongated coil 20 of fine wire, shaped to occupy a very small cross-sectional area, is suspended within the gap between the pole pieces. It is composed of a fine insulated wire, such as No. 48 enameled, or even smaller, and may be on an arbor formed suitable for winding such fine wire. The winding is preferably done in such a manner that the coil is substantially cylindrical in form with a circular cross-section. The wires forming this coil are preferably cemented together so that the coil maintains a self-supporting form. The coil may conveniently be about .5 inch in length and of a diameter of about .015 inch in circular cross-section. The center portion of the coil is reinforced by elongated stiffening elements 21 positioned longitudinally within the coil and bonded to the coil with cement. Conveniently, the stiffening elements are of a light material, such as quartz or glass, and are shaped to give the entire coil assembly approximately a circular cross-section. The orientation of the stiffening rods to this end is shown in Fig. 3.

The coil is suspended within the air gap between an upper suspension wire 22 and a lower suspension wire 23 as shown in detail in Fig. 2. The suspension wires may conveniently be No. 40 beryllium copper wire. The upper end of the upper suspension wire is anchored to a tension spring 24 which in turn is anchored to a central terminal post 25 sealed through the upper end of the case. The central treminal post provides one external contact for the coil. The lower portion of the upper suspension wire is reinforced by a tubular stiffener 26 disposed coaxially about the wire and rigidly attached thereto, as by solder. A mirror 27 is mounted in a notch 28 in the stiffener so as to be in alignment with a window 29 in the wall 13. The upper end of the coil is rigidly attached to the stiffener by means of a stirrup 30 looped through the upper end of the coil. The upper ends of the stirrup are secured to the stiffener by turns of wire 31 and a turn of coil lead 32. The ends of the stirrup, the turns of wire, and the turn of coil lead are attached to the stiffener by solder. The lower end of the coil is secured to the upper end of the lower suspension wire by means of a stirrup 33 fastened directly to the wire.

The lower end of the lower suspension wire is attached to a conductive cap 34 in the shape of an inverted mushroom, and is fitted into the lower end of a damping tube 35. The diameter of the stem of the cap is slightly less than the I. D. of the tube and the maximum diameter of the cap is equal to the O. D. of the tube. The damping tube is disposed coaxially within the galvanometer case around the lower suspension wire, the coil, and a portion of the upper suspension wire. The upper end of the tube bears against a retaining washer 36 soldered within the galvanometer case across the upper part of groove 11. A channel 37 for connecting the interior and exterior of the tube is provided in the cap. Preferably, the channel is provided near the center of the cap and the lower suspension wire is centered within the tube by soldering it in a portion of the channel. Conveniently, the tube is transparent and of an electrical insulating material such as glass. As pointed out above, the coil and stiffening elements within the coil are designed to have a cross-section approximating that of a circle. This reduces the tendency of the oscillating coil to "pump" a fluid (not shown) which fills the damping tube. Thus, a more nearly viscous damping of the coil is obtained.

The lower end of the damping tube is a close fit in the smaller bore in the case, and is sealed and secured internally to the case by means of a gasket 38 disposed around the lower end of the tube and adapted to seat upwardly against a shoulder 39 formed internally in the case. A cup 40 fits over the lower end of the tube and seats on the gasket. The cup is provided with an external projection 41 on its lower end to facilitate assembly and disassembly of the cup. A compression screw 42 bears against the lower end of the cup and effects a fluid-tight seal between the cup and the lower end of the tube.

One end of a suitable insulated connecting wire 43 is soldered to the cap and the other end of the wire is carried upwardly out the upper end of the tube. The wire is cemented inside the full length of the glass tube. The upper end of the wire is soldered to an electrical lead 44 which passes through an opening in the side wall 14 and is anchored to a side terminal post 45 positioned in a terminal box 46 attached to the upper part of side wall 14. The side terminal post provides the second external contact for the coil.

The damping tube is filled with a suitable damping fluid after the coil has been suspended in the case. The case is held in substantially a vertical position, the lower end of the tube being open by virtue of the channel provided in the cap. A small amount of damping fluid is measured into the cup not yet assembled. The cup is then inserted in the bore provided at the lower end of the case and the compression screw is screwed in behind the cup to force it against the washer and effect a tight seal between the cup and lower end of the tube. Sufficient fluid is displaced from the cup by the cap and the lower end of the tube to substantially fill the tube. When a transparent damping tube is used, visual inspection readily determines if the tube is properly filled to the desired level without trapping air bubbles in the tube.

Fig. 4 illustrates an alternate method for employing the present invention in a galvanometer. The arrangement shown in Fig. 4 is similar to that illustrated in Fig. 1 and like numbers are used to indicate like parts. A metal washer 47, having an I. D. only slightly larger than the O. D. of the damping tube 35 is cemented to the damping tube near its lower end. The damping tube is disposed within the galvanometer case as in Fig. 1 and the washer seats upwardly against the shoulder 39 formed internally in the case. A solid cap 48 in the shape of an inverted mushroom is cemented in the lower end of the damping tube so as to effect a fluid-tight seal. The lower end of the suspension wire 23 is soldered to the cap. The lower end of the connecting wire 43 is also soldered to the cap and the upper end of the connecting wire is carried upwardly out the upper end of the tube, as described for the arrangement illustrated in Fig. 1. A resilient plug 49 is disposed within the longitudinal bore in the bottom of the case so as to bear against the cap in the lower end of the damping tube. The compression screw 42 is adapted to be screwed into the threaded portion of the bore in the lower end of the case and bear against the lower end of the resilient plug so that the washer cemented to the lower end of the damping tube is held up against the shoulder formed internally in the case.

With this arrangement the washer 36, as illustrated in Fig. 1, is not necessary and may be eliminated. To provide for greater stability for the damping tube in the case, cement may be advantageously used to seal the upper portion of the damping tube against the magnetic pole pieces extending into the galvanometer case, as indicated at 50 in Fig. 4.

In the arrangement shown in Fig. 4, the damping tube is filled with oil after assembly by means of a capillary tube (not shown) which is inserted to the bottom of the damping tube during the filling operation. After the tube is substantially full, the capillary tube is withdrawn and the damping arrangement of Fig. 4 operates in the same manner as that shown in Fig. 1.

I claim:

1. In a galvanometer having a coil suspended by upper and lower suspension means between magnet poles and enclosed in a case, a damping arrangement comprising a separate tube enclosed entirely within the case and open at its top and bottom and disposed around the coil and lower suspension means, an electrically conductive cap fitted over the bottom end of the tube for anchoring the lower suspension means, a gasket disposed coaxially around the lower portion of the tube and seated on a shoulder in the case, a cup fitting over the cap and the lower end of the tube and seating on the gasket, and a compression screw adapted to screw into a threaded longitudinal bore in the bottom of the case and bear against the cup so that the bottom end of the tube is made fluid tight.

2. In a galvanometer having a coil suspended by upper and lower suspension means between magnet poles and enclosed in a case, a damping arrangement comprising a separate tube enclosed entirely within the case and open at its top and disposed around the coil and lower suspension means, an electrically conductive cap sealed over the bottom end of the tube, the lower suspension means being anchored thereto, an external projection secured to the lower end of the tube to seat upwardly against an internal projection in the case, a resilient plug disposed in the case adjacent the lower end of the tube, and a compression screw adapted to bear against the lower end of the resilient plug so that the external projection of the tube is held against the internal projection of the case, the arrangement sealing the bottom end of the tube and making it fluid-tight.

3. A galvanometer comprising an upright elongated coil having an open central section, an upper elongated and upright suspension means rigidly attached at its lower end to the upper end of the coil, a lower upright and elongated suspension means rigidly attached at its upper end to the lower end of the coil, a case enclosing the coil and two suspension means, means for producing a magnetic field with lines of flux transverse to the longitudinal axis of the coil, stiffening means rigidly attached to the upper end of the coil and the adjacent portion of the upper suspension means, a mirror rigidly mounted on the first stiffening means, a separate damping tube disposed around the lower suspension means and the coil and entirely disposed within the case, means for anchoring the lower end of the lower suspension at the lower end of the tube, and means for sealing the bottom end of the tube to make it fluid tight.

4. A galvanometer comprising an upright elongated coil having an open central section, an upper elongated and upright suspension means rigidly attached at its lower end to the upper end of the coil, a lower upright and elongated suspension means rigidly attached at its upper end to the lower end of the coil, a case enclosing the coil and two suspension means, means for producing a magnetic field with lines of flux transverse to the longitudinal axis of the coil, first stiffening means rigidly attached to the upper end of the coil and the adjacent portion of the upper suspension means, a mirror rigidly mounted on the first stiffening means, elongated second stiffening means disposed within the coil to substantially fill the open central section, a separate damping tube disposed around the lower suspension means and the coil and entirely disposed within the case, means for anchoring the lower end of the lower suspension at the lower end of the tube, and means for sealing the bottom end of the tube to make it fluid tight.

5. In a galvanometer having a coil suspended by upper and lower suspension means between magnet poles and enclosed in a case, a damping arrangement comprising a separate tube enclosed entirely within the case and open at its top and bottom, and disposed around the coil and lower suspension means, a cap fitted over the bottom end of the tube for anchoring the lower suspension means, channel means for permitting a fluid to flow past the cap and into the tube, a gasket disposed coaxially around the lower portion of the tube and seated on a shoulder in the case, a cup fitting over the cap and the lower end of the tube and seating on the gasket, and a compression screw adapted to screw into a threaded longitudinal bore in the bottom of the case and bear against the cup so that the bottom end of the tube is made fluid tight.

6. In a galvanometer having a coil suspended by upper and lower suspension means between magnet poles and enclosed in a case, a damping arrangement comprising a separate tube enclosed entirely within the case and open at its top, and disposed around the coil and lower suspension means, a cap sealed over the bottom end of the tube, the lower suspension means being anchored thereto, an external projection secured to the lower end of the tube to seat upwardly against an internal projection in the case, a resilient plug disposed in the case adjacent the lower end of the tube, and a compression screw adapted to bear against the lower end of the resilient plug so that the external projection of the tube is held against the internal projection of the case, the arrangement sealing the bottom end of the tube and making it fluid tight.

References Cited in the file of this patent
UNITED STATES PATENTS

| | | |
|---|---|---|
| 2,439,576 | Morrow | Apr. 13, 1948 |
| 2,492,273 | De Giers | Dec. 27, 1949 |
| 2,519,689 | Morrow | Aug. 22, 1950 |
| 2,596,019 | Fisher | May 6, 1952 |
| 2,657,358 | Richardson | Oct. 27, 1953 |